E. L. TEICH.
BUTT HINGE.
APPLICATION FILED MAY 16, 1914.
1,139,921.  Patented May 18, 1915.
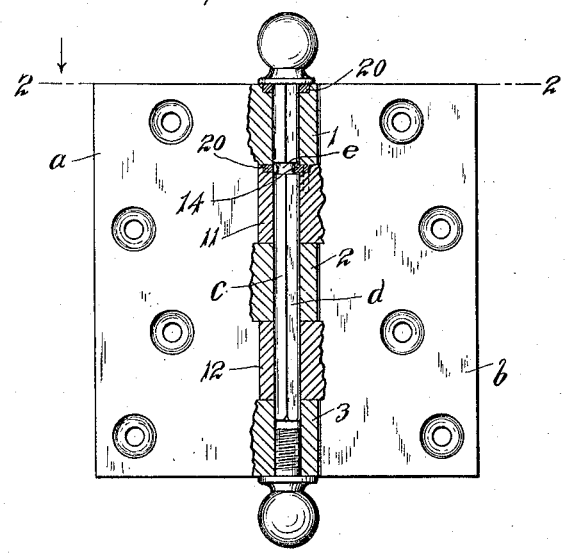
Fig. 1.
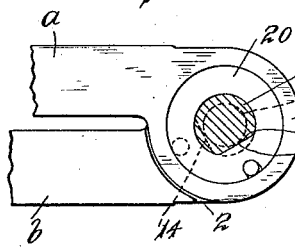
Fig. 2.
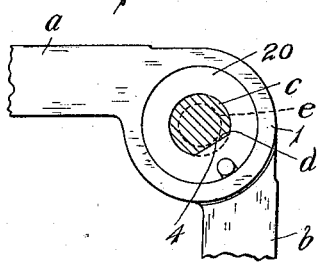
Fig. 3.
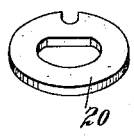
Fig. 4.
Fig. 5.
WITNESSES:
Louis Lucia
Anne E. O'Brien
INVENTOR.
Ernest L. Teich:
BY
HIS ATTORNEY.

UNITED STATES PATENT OFFICE.

ERNEST L. TEICH, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

BUTT-HINGE.

1,139,921.      Specification of Letters Patent.      Patented May 18, 1915.

Application filed May 16, 1914. Serial No. 839,033.

*To all whom it may concern:*

Be it known that I, ERNEST L. TEICH, a citizen of the United States, and a resident of New Britain, in the county of Hartford and State of Connecticut, have invented certain new and useful Improvements in Butt-Hinges, of which the following is a specification.

The object of this invention is to provide a simple and efficient means for locking a butt pin against removal, either accidental or intentional, except in one position of the leaves.

The invention is illustrated in the drawings, wherein—

Figure 1 is a front view of a butt embodying my invention, with the knuckles shown in section. Fig. 2 is a top view on the line 2—2 of Fig. 1, showing the leaves in the locked position. Fig. 3 is a similar view but showing the leaves in the assembly position. Fig. 4 is a view of the washer which forms the ledge. Fig. 5 is a view of the pin.

In the drawings $a$ denotes one leaf equipped with the usual knuckles 1, 2, and 3, and $b$ the other leaf provided with the knuckles 11, 12. As is customary the knuckles are centrally apertured to receive the pin $c$ which unites the two leaves.

The lock for the pin is provided by flattening one side of the aperture in a knuckle on each leaf to provide an inwardly extending ledge of slight depth, as indicated at 4 in knuckle 1, and 14 in knuckle 11. The pin is also flattened at one side as indicated at $d$, and circumferentially grooved as at $e$ at a point which will register with one of the ledges, as 14, in order that the leaf $b$ for instance may turn on the pin and the pin be locked to this leaf in all except the assembly position.

To introduce the pin the leaves must be so positioned with relation to one another as to bring the ledges into alinement, when the pin with its flat side next said ledges can be pushed into place. As soon as the leaves are moved from this assembly position the pin becomes locked as above stated by the engagement of one of the ledges with the groove. This assembly position of the leaves will be other than their closed position in order that the pin shall be locked when the door is shut and so prevent the removal of the pin and door. The pin is always connected for movement with one leaf, as by the bottom of its flat side with one of the ledges.

A convenient way of forming the ledges is illustrated and consists in recessing the ends of the knuckles and introducing into the recess a washer 20 provided with an irregular hole, a wall of which lies over a part of the knuckle apertures to form the ledge. The washers are pinned to the knuckle to prevent their displacement.

It is not my intention to limit myself to the exact construction here illustrated and described.

I claim as my invention:

1. The combination with butt leaves and their alined knuckles, and a pin passing through said knuckles to connect said leaves together, of a ledge formed in a knuckle of one leaf, said pin being of proper cross-sectional shape to enter the knuckles and pass said ledge, and a circumferential groove in said pin in alinement with said ledge.

2. The combination with butt leaves provided with knuckles, and a pin passing through said knuckles to connect said leaves together, of a recess in the end of a knuckle of one leaf, a washer fitting in said recess provided with an irregular opening, a wall of which overlies the aperture in said knuckle at one side to form a ledge, means for fastening said washer to said knuckle, a pin extending through the alined knuckles of both leaves to secure them together, said pin being shaped on one side to pass said ledge and circumferentially grooved opposite thereto, and means for fastening said pin to the other leaf.

3. The combination with butt leaves provided with alined knuckles, one knuckle of each leaf being provided with a transverse interruption in its bore, the said interruptions being in alinement in the assembly position of the leaves, a pin of proper cross section to enter said knuckles and pass said interruptions in the assembly position of the leaves, and a circumferential groove in said pin registering with and adapted to receive one of the said interruptions.

ERNEST L. TEICH.

Witnesses:
C. D. NEALE,
C. A. PARKER.

Copies of this patent may be obtained for five cents each, by addressing the "Commissioner of Patents, Washington, D. C."